(12) United States Patent
Swadesh

(10) Patent No.: US 10,890,281 B2
(45) Date of Patent: Jan. 12, 2021

(54) ADJUSTABLE LENGTH PIPE CONNECTOR FOR CONNECTING TO A PIPE CONNECTION

(71) Applicant: Kumar Gupta Swadesh, Uttar Pradesh (IN)

(72) Inventor: Kumar Gupta Swadesh, Uttar Pradesh (IN)

(*) Notice: Subject to any disclaimer, the term of this patent is extended or adjusted under 35 U.S.C. 154(b) by 329 days.

(21) Appl. No.: 15/754,600

(22) PCT Filed: Aug. 23, 2016

(86) PCT No.: PCT/IN2016/000215
§ 371 (c)(1),
(2) Date: Feb. 23, 2018

(87) PCT Pub. No.: WO2017/033203
PCT Pub. Date: Mar. 2, 2017

(65) Prior Publication Data
US 2018/0238476 A1 Aug. 23, 2018

(30) Foreign Application Priority Data
Aug. 25, 2015 (IN) .......................... 2633/DEL/2015

(51) Int. Cl.
| F16L 15/02 | (2006.01) |
| F16L 41/10 | (2006.01) |
| A62C 35/68 | (2006.01) |
| E03C 1/04  | (2006.01) |

(52) U.S. Cl.
CPC .............. *F16L 15/02* (2013.01); *F16L 41/10* (2013.01); *A62C 35/68* (2013.01); *E03C 1/0403* (2013.01)

(58) Field of Classification Search
CPC .......... F16L 27/12; F16L 27/125; F16L 15/02
USPC ............ 285/302, 303, 208, 220, 221, 143.1
See application file for complete search history.

(56) References Cited

U.S. PATENT DOCUMENTS

| 689,630 A | * | 12/1901 | Autenrieth | ............ F16L 37/091 |
| | | | | 285/39 |
| 1,570,520 A | * | 1/1926 | Oehrli | ................. G01M 3/2876 |
| | | | | 285/143.1 |
| 3,006,665 A | * | 10/1961 | Harris | ..................... F16L 27/12 |
| | | | | 285/302 |
| 3,083,914 A | * | 4/1963 | Smith | ................... B05B 15/658 |
| | | | | 239/203 |
| 3,317,144 A | * | 5/1967 | Muschett | ................ B05B 15/70 |
| | | | | 239/204 |

(Continued)

*Primary Examiner* — David Bochna

(57) ABSTRACT

An adjustable length pipe connector having an axially extending and hollow pipe body with internal threads provided therein. The pipe body includes external threads provided on outer portion thereof for coupling the connector to a pipe connection. Further, the pipe body includes a washer provided within the pipe body. The washer is adapted to be moved axially within the interior portion. Also, a first and a second length adjustor peg is provided within the pipe body. The first and the second length adjustor pegs can be moved and positioned adjacent to the washer so as to achieve a desirable length of the adjustable length connector. Upon achieving the desirable length, the washer is juxtaposed relative to the first peg and an excess portion of the pipe body adjacent the second end is removed. The washer may be cylindrical. The washer may have a wire mesh to block impurities.

13 Claims, 14 Drawing Sheets

(56) References Cited

U.S. PATENT DOCUMENTS

| | | | | |
|---|---|---|---|---|
| 3,684,179 A * | 8/1972 | Fischer | B05B 15/70 | 239/203 |
| 3,874,714 A * | 4/1975 | Bebinger | A47L 15/4217 | 285/354 |
| 3,893,440 A * | 7/1975 | Dooley | F01L 13/08 | 123/182.1 |
| 4,018,459 A * | 4/1977 | Mominee | F16L 41/14 | 285/5 |
| 4,072,271 A * | 2/1978 | Voss | B05B 1/302 | 239/541 |
| 4,274,592 A * | 6/1981 | Westhusin | F16L 27/1274 | 239/200 |
| 4,590,960 A * | 5/1986 | Koble, Jr. | F24F 6/04 | 137/15.26 |
| 4,688,830 A * | 8/1987 | Meisinger | F16L 17/02 | 138/89 |
| 4,762,140 A * | 8/1988 | Davis | F16K 15/02 | 137/68.14 |
| 4,852,602 A * | 8/1989 | McKinnon | F16K 15/021 | 137/68.14 |
| 5,002,318 A * | 3/1991 | Witter | F16L 27/1273 | 285/302 |
| 5,372,306 A * | 12/1994 | Yianilos | B05B 1/304 | 137/68.11 |
| 6,050,500 A * | 4/2000 | Ensworth | B05B 15/656 | 239/203 |
| 6,224,596 B1 * | 5/2001 | Jackson | A61B 17/7032 | 411/5 |
| 6,959,880 B2 | 11/2005 | Swingley | | |
| 7,207,400 B2 * | 4/2007 | Bise | E21B 17/03 | 175/320 |
| 2005/0077725 A1 * | 4/2005 | Bartholoma | F16L 5/027 | 285/143.1 |
| 2020/0003347 A1 * | 1/2020 | Ball | F16L 27/12 | |
| 2020/0041060 A1 * | 2/2020 | Pearl, II | F16L 55/164 | |

\* cited by examiner

ASSEMBLY

TOP VIEW

RIGHT VIEW     FRONT VIEW

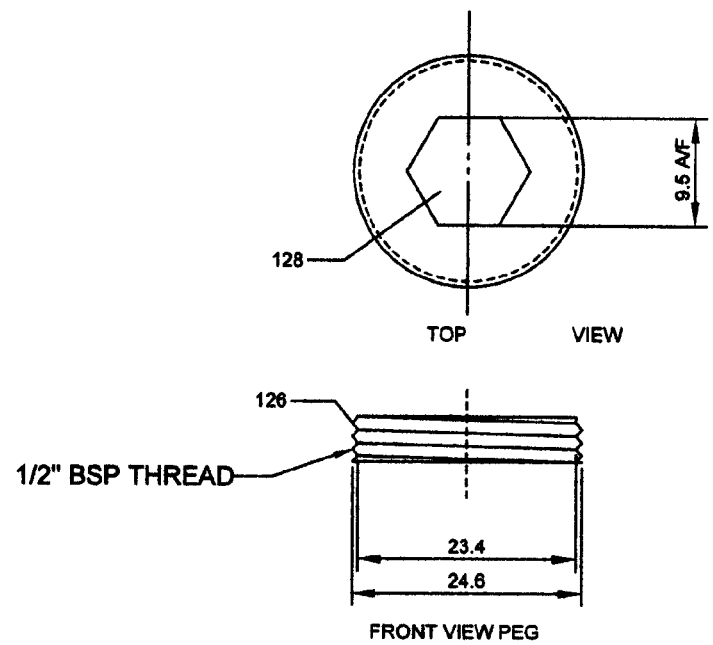
Fig 2
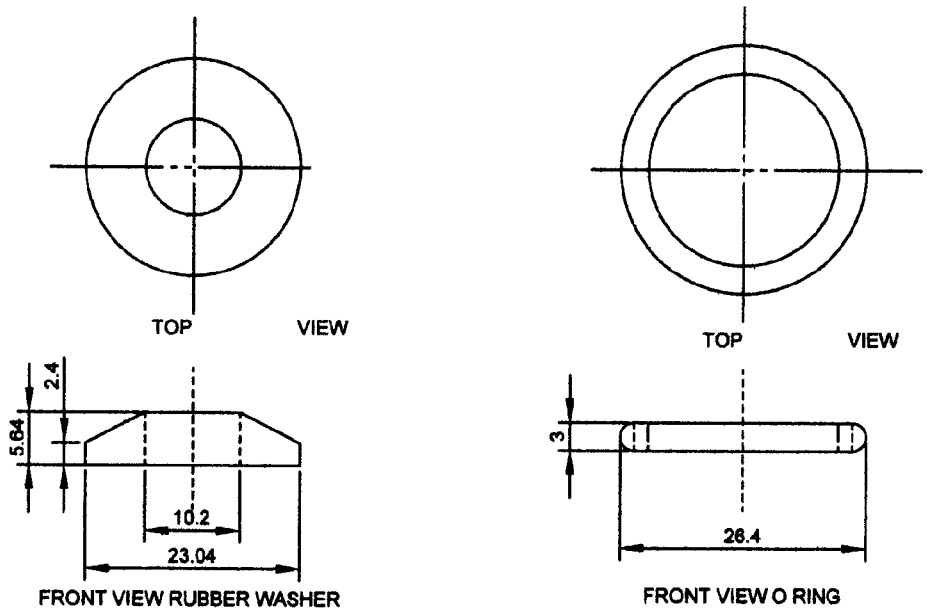
Fig 3
Fig 4

ASSEMBLY SECTION

ASSEMBLY

TOP VIEW WASHER

FRONT VIEW WASHER

FRONT VIEW RUBBER WASHER

| NO. | PARTICULAR |
|---|---|
| 1 | PIPE LINE WITH T BLOCK |
| 2 | O RING |
| 3 | EXTENSION PIPE |
| 4 | ALLEN KEY |
| 5 | LENGTH ADJUSTABLE PEG |
| 6 | LOCK PEG |
| 7 | WASHER |

EXTENSION PIPE 50 mm (ADJUSTABLE LENGTH PIPE CONNECTION)

| EXTENSION PIPE 50 mm (ADJUSTABLE LENGTH PIPE CONNECTION) ||
|---|---|
| NO. | PARTICULAR |
| 1 | PIPE LINE WITH T BLOCK |
| 2 | O RING |
| 3 | EXTENSION PIPE |
| 4 | WASHER |

ADJUSTABLE LENGTH PIPE CONNECTOR FOR CONNECTING TO A PIPE CONNECTION

FIELD OF THE DISCLOSURE

This invention relates to sanitary fittings, and more particularly, to an improvised pipe connector for coupling a tap or faucet to a pipe connection such that the pipe connector is adjustable in length.

BACKGROUND OF THE DISCLOSURE

Pipe connectors are widely used for connecting a tap or faucet to a mains water supply or pipe connections extending from the mains water supply. In principle, the pipe connections to and from the mains water supply are generally laid at the time of construction of the premises and taps/faucets are connected at a later stage, such as when the premises is ready to be inhabited. Typically, the pipe connections are T-joints or socket joints or elbow joints having an open end, threaded to couple a tap/faucet thereto. Since the open end of T/socket/elbow joint are embedded within the walls, it generally happens that pipe extensions of varying lengths may be required to couple taps/faucets to the open end of the pipe connections so as to take into account the depth at which the open end is situated within the walls.

A conventional pipe extension 10 is shown in FIG. 1A and includes a pipe body 12 having internal threads. An end portion 14 of the pipe body 12 has external threads (as shown) which mate with threads within the open end of the T/socket/elbow joint. Conventional pipe extensions come in standard size and generally have a long end portion having external threads. Since the open end of the T/socket/elbow joint may be available at different depths within walls at different locations, while fitting the pipe extension to the open, a desired length of the pipe body is measured and excess length is cut-off. The tap/faucet is thereafter fixed to the exposed end of the pipe body. However, depending upon the depth within the wall at which the open end of T/socket/ Elbow joint is positioned, it may happen that the entire length of the external threads of the end portion 14 may be required to be received within the T/socket/elbow joint. This has an inherent problem that in the end portion 14 may extend deep into the body of T/socket/elbow joint, which may cause interference with the water flow from the body of the T/socket/elbow joint to the pipe extension. Alternatively, it may happen that only partial length of the external threads of the end portion 14 is required to be received within the T/socket/elbow joint leaving some part of the external threads exposed beyond the open end. This may cause leakage at the open end.

In addition, when fixing the pipe extension to the open end, generally a wrench is used so as to rotate the pipe extension into the open end for enabling the external threads to mate with threads in the open end. To ensure a leak-proof connection, it may happen that the pipe extension is given an extra turn of rotation over that actually required. Generally, the T/socket/elbow joints are made of PVC, UPVC, PPR or any other durable plastic material and any extra turns of rotation so given may result in cracks developing in the body of the T/socket/elbow joints, which may be source of leakage, thereby leading to the walls having seepage of water.

Moreover, while mating the external threads of the end portion 14 to the open end, a plumber generally uses cotton thread, Teflon tape, zinc stain paste or a combination thereof to act as a sealant. While this is cumbersome, the sealing may not be leak-proof and may lead to leakage over extended usage. This may cause undesirable seepage within the walls.

Various alternate techniques have been proposed for configuring pipe extensions with adjustable length. U.S. Pat. No. 6,959,880 recites a length adjustable conduit having a hollow tubular body and a hollow tubular shaft disposed coaxially in fluid tight communication with the hollow body. The conduit includes an adjustment mechanism for adjusting the combined length of the tubular body and the tubular shaft. The adjustment mechanism comprises a threaded mechanism so as to move the tubular body relative to the tubular shaft.

However, the afore-said adjustable pipe extensions also have various inherent drawbacks. For instance, the adjustment mechanism includes parts that require complex machining to ensure proper fit and provide a leak-proof connection. Besides, the said conduit is difficult to assemble and requires aid of a skilled personnel for installation.

Accordingly, there exists a need for a pipe extension, for coupling a tap to mains water supply, such that the length of the pipe extension may be adjusted as per requirement.

There further exists a need for a pipe extension, which is easy to install without requiring the services of a skilled personnel, such as a plumber and also is relatively leak-proof.

There also exists a need for a pipe extension that has simple construction and does not use parts that require complex machining.

Objects of the Disclosure

In view of the foregoing disadvantages inherent in the prior art, the general purpose of the present invention is to provide a pipe connector for coupling a tap/faucet to mains water supply.

Accordingly, an object of the present invention is to provide a pipe connector for connecting a tap/faucet to a pipe connection, say T/socket/elbow joint, such that the length of the pipe connector is capable of being adjusted as per requirement.

Another object of the present invention is to provide an adjustable length pipe connector which is easy to install without requiring the services of a skilled personnel, such as a plumber and also is relatively leak-proof.

Yet another object of the present invention is to provide an adjustable length pipe connector which is easy to manufacture, has simple construction and includes parts that do not require complex machining.

Still another object of the present invention is to provide an adjustable length pipe connector which is easy to fit to the pipe connections, say T/socket/elbow joint.

Still another object of the present invention is to provide an adjustable length pipe connector that couples to a pipe connection while ensuring a leak-proof joint that does not leak even after extended usage.

These and other objects and advantages of the invention will be clear from the ensuing description.

SUMMARY OF THE DISCLOSURE

In light of the above objects, disclosed is a pipe connector for coupling a tap/faucet to a mains water supply connection.

In an aspect of the present invention, disclosed is an adjustable length pipe connector for connecting to a pipe connection. The adjustable length pipe connector includes an axially extending and hollow pipe body having a front body portion of a first predetermined length and a rear body portion of a second predetermined length. The front body portion has internal threads configured therein, and the rear body portion has external threads configured thereon for coupling the adjustable length connector to the pipe connection. The pipe connector also includes a peripheral flange configured on the rear body portion. The flange is positioned adjacent to portion between the front body portion and the rear body portion. Also, the pipe connector includes a seal ring positioned adjacent to the peripheral flange and a washer configured within the front body portion. The washer being adapted to be moved axially within the front body portion. The present invention envisages that the front body portion has a hexagonal shape, and the rear body portion has a hexagonal through-bore configured on a transverse face thereof. In use, the first predetermined length may be cut to a desired length.

In another aspect of the present invention, a pair of length adjustor peg is configured within the front body portion. The length adjustor pegs are adapted to be positioned with the front body portion to achieve the desired length.

In yet another aspect of the present invention, each of the pair of length adjustor pegs has a central hexagonal bore for enabling fluid entering through the pipe connection to pass therethrough.

In still another aspect of the present invention, each of the length adjustor pegs has threads configured on peripheral surface thereof so as to mate with the internal threads of the front body portion for enabling the pegs to be moved within the front body portion, thereby achieving the desired length.

In still another aspect of the present invention, the washer is frustoconical in shape for enabling easy insertion and manipulation within the front body portion.

In still another aspect of the present invention, the first and the second length adjustor pegs are made of plastic, such as nylon, polycarbonate etc. or metal such as brass, aluminium, SS and the like.

In still another aspect of the present invention, the washer is made of rubber, such as synthetic, nitrile, silicon, EPDM and the like or natural rubber.

In still another aspect of the present invention, each of the pair of length adjustor pegs has a hexagonal through-bore for receiving an Allen key to move the pegs axially within the front body portion In still another aspect of the present invention, the hexagonal shape of the front body portion and the hexagonal through-bore on the transverse face of the rear body portion are used optionally to tighten the adjustable length pipe connector to the pipe connection.

In still another aspect of the present invention, the seal ring is received in a groove configured on the rear body portion adjacent to the peripheral flange, thereby preventing dislocation of the seal ring.

For a better understanding of the present invention, its operating advantages, and the specific objects attained by its uses, reference should be made to the accompanying drawing and descriptive matter in which there is illustrated an exemplary aspect of the present invention.

BRIEF DESCRIPTION OF THE DRAWINGS

The advantages and features of the present invention will become better understood with reference to the following detailed description taken in conjunction with the accompanying drawings, in which:

FIG. 2 illustrates a top view and front view of length adjustor peg as used in the pipe connector of FIG. 1B, in accordance with an embodiment of the present invention;

FIG. 3 illustrates a top view and front view of washer as used in the pipe connector of FIG. 1B, in accordance with an embodiment of the present invention;

FIG. 4 illustrates top view and front view of seal ring as used in the pipe connector of FIG. 1B;

DETAILED DESCRIPTION OF THE DISCLOSURE

The exemplary embodiments described herein detail for illustrative purposes are subject to many variations in structure and design. It should be emphasized, however, that the present invention is not limited to a particular extension pipe as described. It is understood that various omissions and substitutions of equivalents are contemplated as circumstances may suggest or render expedient, but these are intended to cover the application or implementation without departing from the spirit or scope of the present invention.

The terms "a" and "an" herein do not denote a limitation of quantity, but rather denote the presence of at least one of the referenced item.

In addition, the terms "having", "comprising", "including", and variations thereof signify the presence of a component.

The present invention envisages an adjustable length pipe connector for coupling a tap/faucet to an open end of a pipe connection, such as T-joint, socket-joint or elbow joints coupled to mains water supply. The present invention envisages that the pipe connector is adjustable in length such that a desired length of the pipe connector may be achieved and any excess portion of the pipe connector may be removed. The tap/faucet may then be coupled to the exposed end, obtained by cutting the excess portion, of the pipe connector while ensuring a leak-proof coupling without using any conventional coupling aids, such as zinc paste, cotton threads and the like. The pipe connector, as envisaged by the present invention, will now be explained, in conjunction with the figures, as below.

Figure 1A:
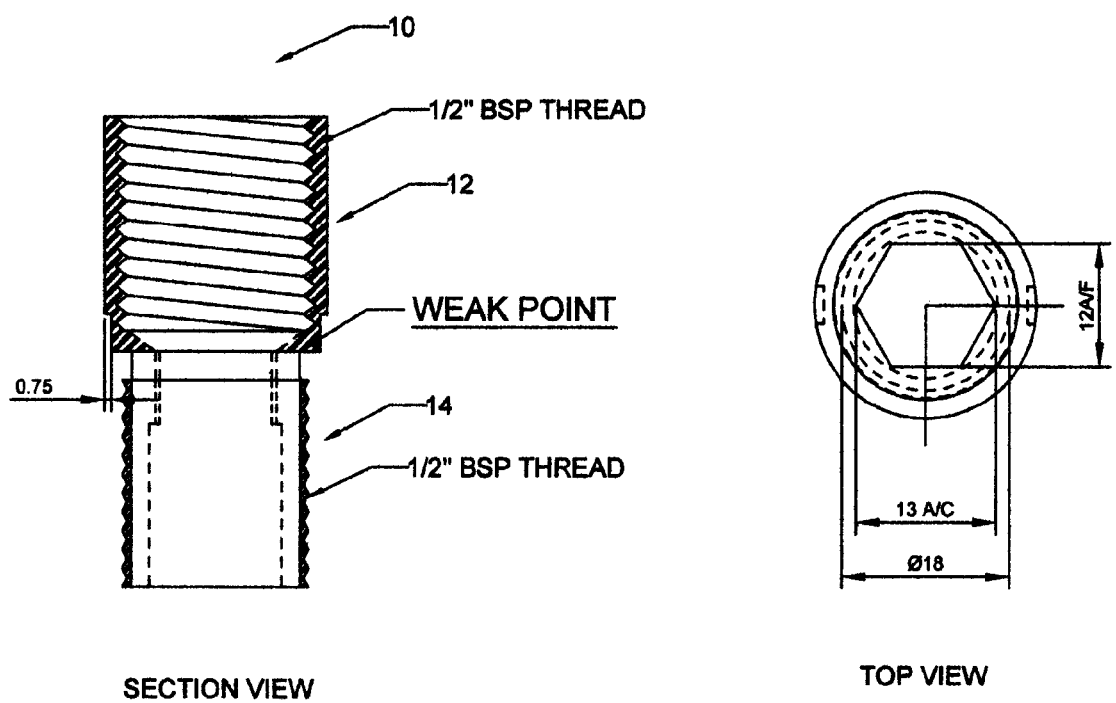
FIG. 1A illustrates a conventional pipe extension.
Figure 1B:
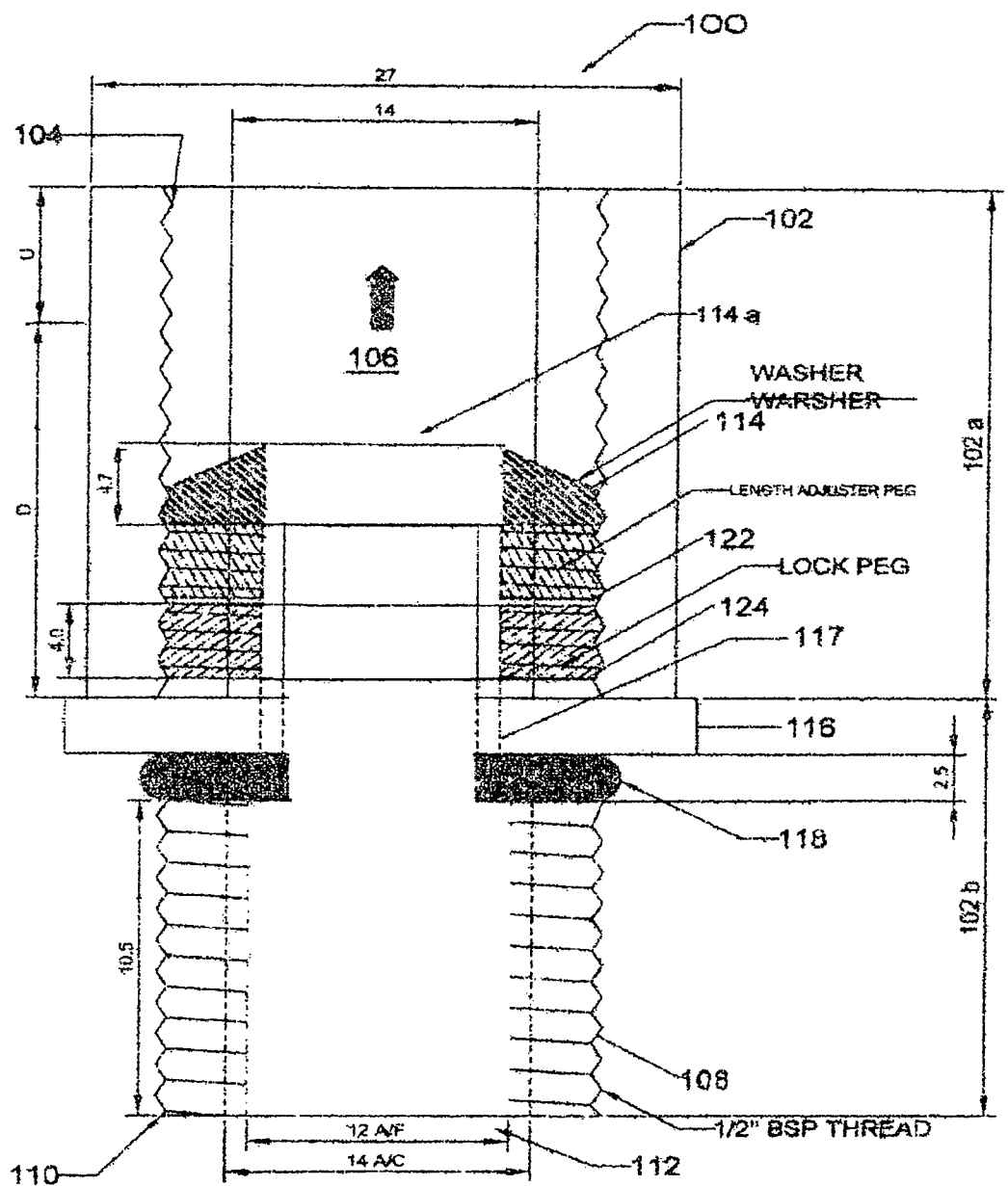
FIG. 1B illustrates a front view of an assembled adjustable length pipe connector, in accordance with an embodiment of the present invention.
Figure 5:
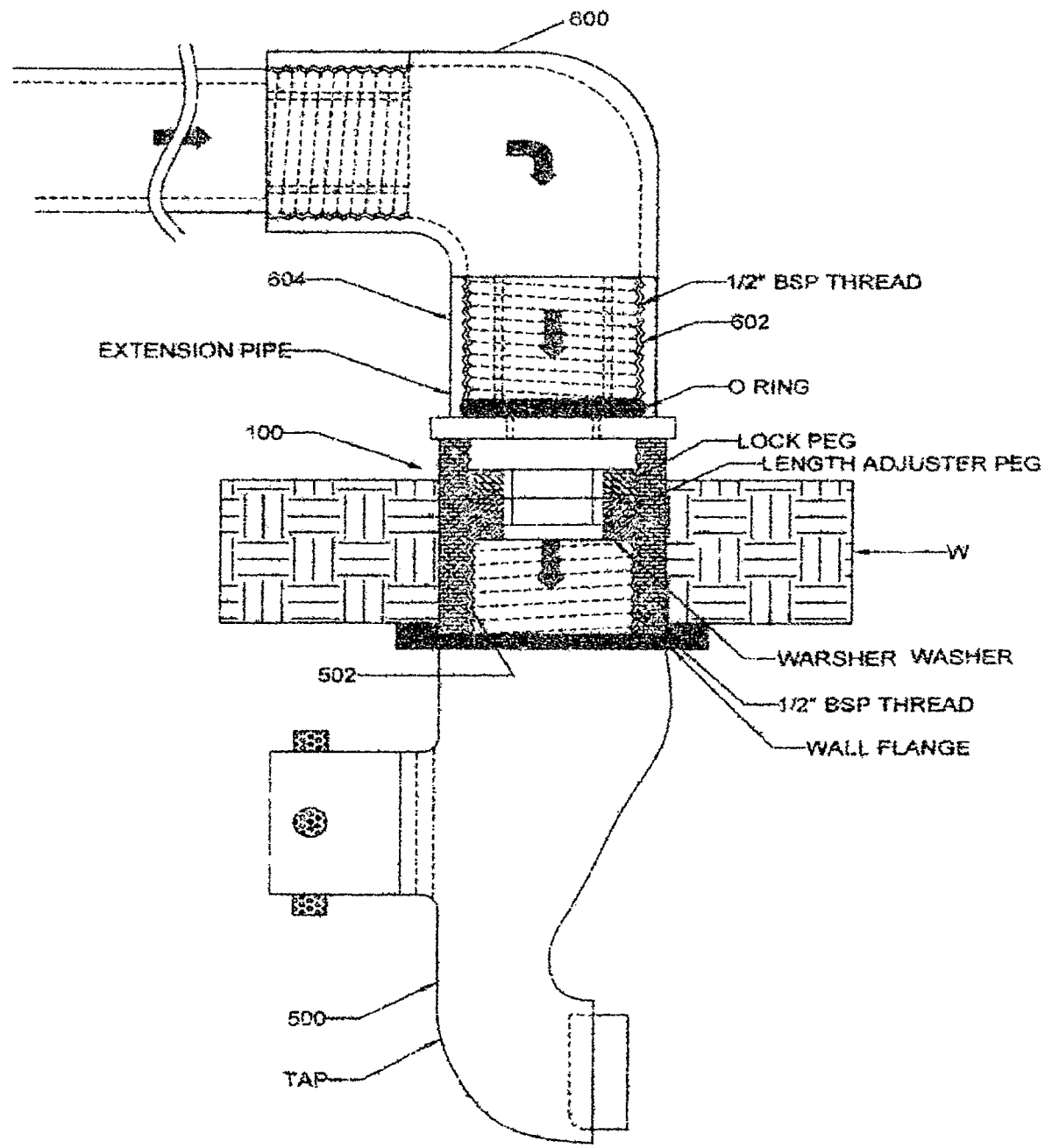
FIG. 5 illustrates a view of the adjustable length pipe connector of FIG. 1B coupled to a pipe connection and a tap/faucet.

FIG. 1B and FIG. 5 illustrate an adjustable length pipe connector 100 (hereinafter referred to as "pipe connector 100") for connecting a tap/faucet (500) to a pipe connection, shown as Elbow joint 600, coupled to mains water supply running into a premises. The present envisages that the pipe connector 100 has adjustable length in the manner that the desired length, as per the type of tap/faucet 500 or the depth the pipe connector 100 has to extend within a wall 'W' so as to connect to the pipe connection, may be retained and any excess length may be conveniently cut and removed. Thus, the same type of pipe connector 100 may be used at different locations by cutting the same into desired lengths. The pipe connector 100 includes hollow pipe body 102 that extends axially, as shown. The hollow pipe body 102 is divided into a front body portion 102a of a first predetermined length and a rear body portion 102b of a second predetermined length. The pipe connector 100 may be made in different lengths varying from 1 inch up to 9 inches.

Figure 1C:
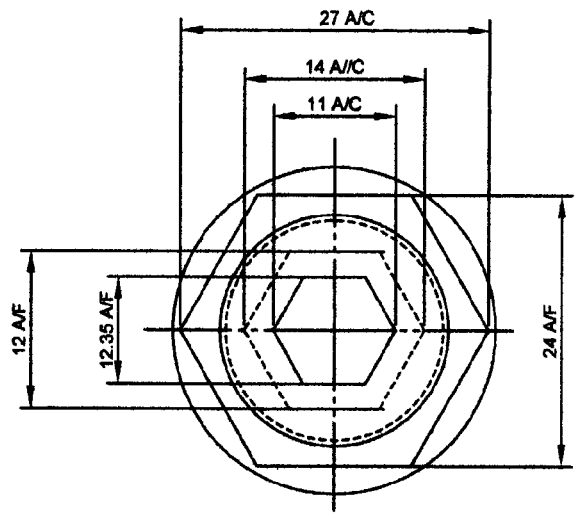
FIG. 1C illustrates a top view of the adjustable length pipe connector of FIG. 1B.
Figure 1C:
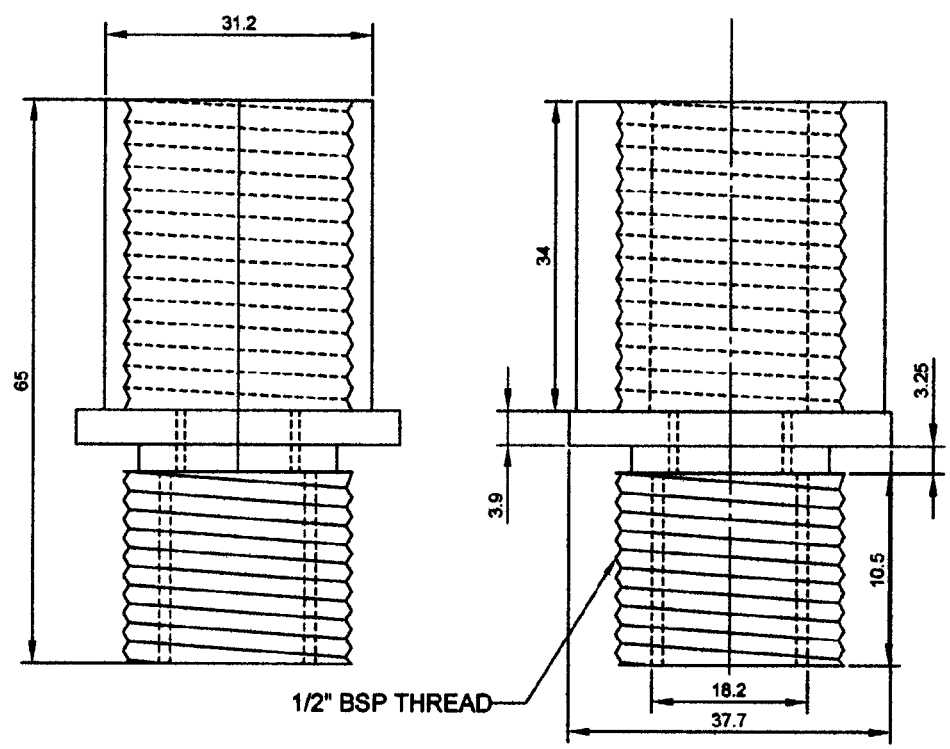

The present invention envisages that the front body portion 102a is hexagonal in shape, as shown in FIG. 1C, which is a top view of the pipe connector 100. The hexagonal shape enables a tightening wrench to easily clasp the front body portion 102a and tighten the pipe connector 100. Further, the front body portion 102a has internal threads 104 configured on interior portion 106 thereof. It is to be noted that the present invention should not be construed to be limited to the hexagonal shape of the front body portion 102, and the same may have any other shape, such as octagonal, square, pentagonal or circular. The internal threads 104 are adapted to mate with complementary external threads provided on a tap/faucet body for enabling a fluidic communication between the front body portion 102a and the tap/faucet 500, as shown in FIG. 5. The present invention envisages that the internal threads 104 extend on the entire first predetermined length of the first body portion 102a. Further, there are external threads 108 configured on the entire second predetermined length of the rear body portion 102b. The external threads 108 help in coupling the pipe connector 100 to the pipe connection, such as Elbow joint 500, as shown in FIG. 5. Particularly, the external threads 108 mate with internal threads 602 configured on the open end 604 of the elbow joint 600.

Further, the rear body portion 102b has a transverse face 110 on which a hexagonal through-bore 112 is configured. The hexagonal through-bore 112 is in fluid communication with the interior portion 106 of the first body portion 102a and is depicted in FIG. 1C.

Further, a washer 114 having a bore 114a is configured within the front body portion 102a, particularly in the interior portion 106. The washer 114 is adapted to be moved axially within the interior portion 106 depending on the desired length of the pipe connector 100. The washer 114 may be made of rubber, such as synthetic, nitrile, silicon, EPDM and the like or natural rubber and has a frustoconical shape that enables easy insertion and manipulation within the interior portion 106. The present invention should not be considered as limited to the frustoconical shape of the washer 114 only and the same may have any other shape such as flat disc shape, flat ring shaped (such as an O-ring) and the like. FIG. 3 illustrates a top view and front view of the washer 114. During assembly, for connecting the front body portion 102a to the threaded end 502 of the tap/faucet 500, as shown in FIG. 5, the washer 114 is firstly pushed down the hollow first body portion 102a and thereafter, the threaded end 502 is received in the front body portion 102a. The washer 114 acts as a packing and enables a leak-proof connection between the tap/faucet 500 and the pipe connector 100. Particularly, the washer 114 avoids the use of conventional means, such as Teflon tape, zinc stain paste, cotton thread or any combination thereof, for sealing the connection between the threaded end 502 and the front body portion 102a. Further, owing to the frustoconical shape, the washer 114 exhibits high intrinsic strength and thus it is able to sustain even high water pressures without yielding to the same.

Referring back to FIG. 1B, a peripheral flange 116 may be configured on the rear body portion 102b and particularly at the portion between the front body portion 102a and the rear body portion 102b. The peripheral flange 116 also has a hexagonal bore 117 concentric with the hexagonal through-bore 112 of the rear body portion 102b. Also, a seal ring 118 is positioned adjacent to the peripheral flange 116. FIG. 4 illustrates a top view and front view of the seal ring 118. In an embodiment of the present invention, the seal ring 118 has an external diameter of 22 mm. However, the present invention should not be construed to be limited to the described size only and the seal ring 118 may have any suitable size. The pipe connector 100 is now coupled to the water supply out and protruding from the wall. A groove (not shown) is configured on the rear body portion 102b just adjacent to the peripheral flange 116 so as to receive the seal ring 118 therein. The peripheral flange 116, acting as a support structure, together with the groove prevents axial displacement of the seal ring 118 when in use. Also, the peripheral flange 116 acts as a barrier that abuts the open end 604 of the pipe connection, as shown in FIG. 5, and prevents any further axial movement of the pipe connector 100 while tightening the same to the open end of the pipe connection. Consequently, a person fitting the pipe connector 100 would not be able to rotate the same any further once the peripheral flange 116 abuts the open end, and as a result any unnecessary tightening of the pipe connector 100, than what is actually required is avoided. This also prevents the open end from cracking due to excessive and/or accidental tightening or even slipping of thread.

The present invention further envisages that a first length adjustor peg 122 and a second length adjustor peg 124 are optionally configured within the hollow body portion 102 and particularly, the first body portion 102a. The pegs 122 and 124 are adapted to be moved axially within the front body portion 102a at a position that represents the desired length of the front body portion 102a. The pegs 122 and 124 are also adapted to act as a support for the washer 114 and prevents displacement of the washer 114 when the pipe connector receives heavy water flow. As shown, the second length adjustor peg 124 is disposed away from the washer 114 but adjacent to the first length adjustor peg 122 so as to provide support thereto. In an embodiment of the present invention, the pegs 122 and 124 are made of plastic such as nylon, polycarbonate etc. or metal such as brass, aluminium, SS and the like.

The present invention envisages that the first length adjustor peg 122 and the second length adjustor peg 124 are adapted to be moved axially in the interior portion 106 so as to achieve the desired length of the first body portion 102, as will be explained later. To enable this, each of the first and the second length adjustor pegs (122, 124) has threads 126, as shown in FIG. 2, configured on peripheral surface thereof.

These threads 126 are adapted to mate with the internal threads 104 of the first body portion 102a when the pegs 122, 124 are configured therein, as shown in FIG. 1B.

Further, each of the first and the second length adjustor pegs 122, 124 are configured with a central bore for enabling fluid entering through the pipe connection (once the pipe connector 100 is coupled thereto) to pass. In this regard, reference is made to FIG. 2 which depicts top and front view of the first length adjustor peg 122. As shown, a through bore 128 is configured on the peg 122. Further, the second length adjustor peg 124 is configured similar to the first length adjustor peg 122, and thus the same is not being explained in detail herein. Moreover, the pegs 122, 124 may be made of plastic, such as Nylon POLYCARBONATE, POC, ABS PVC. In an embodiment of the present invention, the bore 128 is hexagonal in shape.

Figure 6:
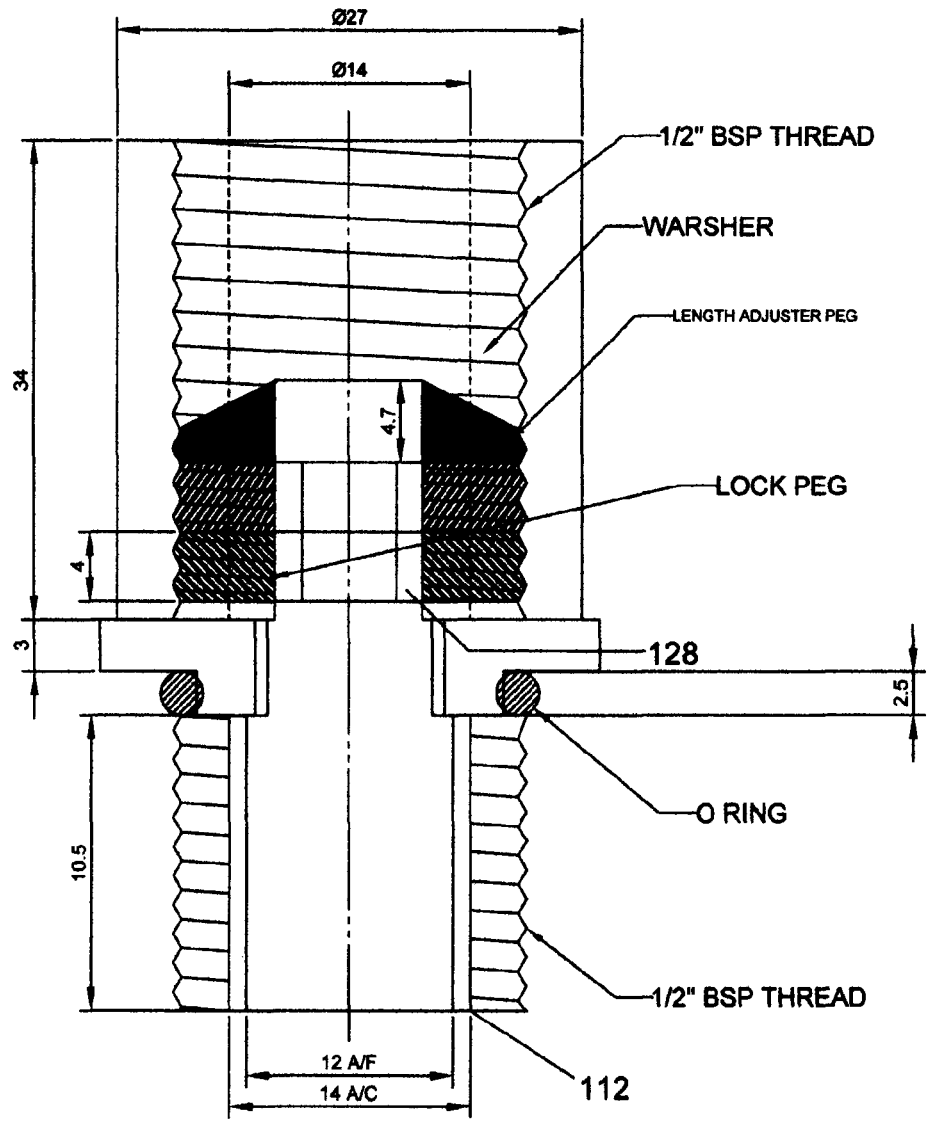
FIG. 6 illustrates a sectional view of the adjustable length pipe connector of FIG. 1B.

To tighten the pipe connector 100 to the open end 604 of the pipe connection, the present invention envisages an alternate arrangement, as will be explained now. The pipe connector 100 is adapted to be rotated and tightened to the open end 604 of the pipe connector by means of an Allen key of appropriate size adapted to be received in the hexagonal bore 117 of the peripheral flange 116 Further, in an embodiment of the present invention, the bore 128 may have the same size as that of the hexagonal through-bore 112 on the transverse face 110 of the rear body portion 102b and the through-bore 117 of the peripheral flange 116. In yet another embodiment, the bore 128 may have same size as the through-bore 117 but smaller size as compared to the hexagonal through-bore 112. This is shown in FIG. 6, which is a sectional view of the pipe connector 100 along its axis. This helps to provide extra strength at the joint between the peripheral flange 116 and the rear body portion 102b, and that between the peripheral flange 116 and the first body portion 102a. In the described embodiment, the through-bore 117 and the through-bore 112 have the same size and thus water can flow therethrough without any obstruction.

However, the present invention should not be construed to be limited to the hexagonal shape of any of the bores and any other shape would also lie within the scope of the present invention.

Figure 7A:
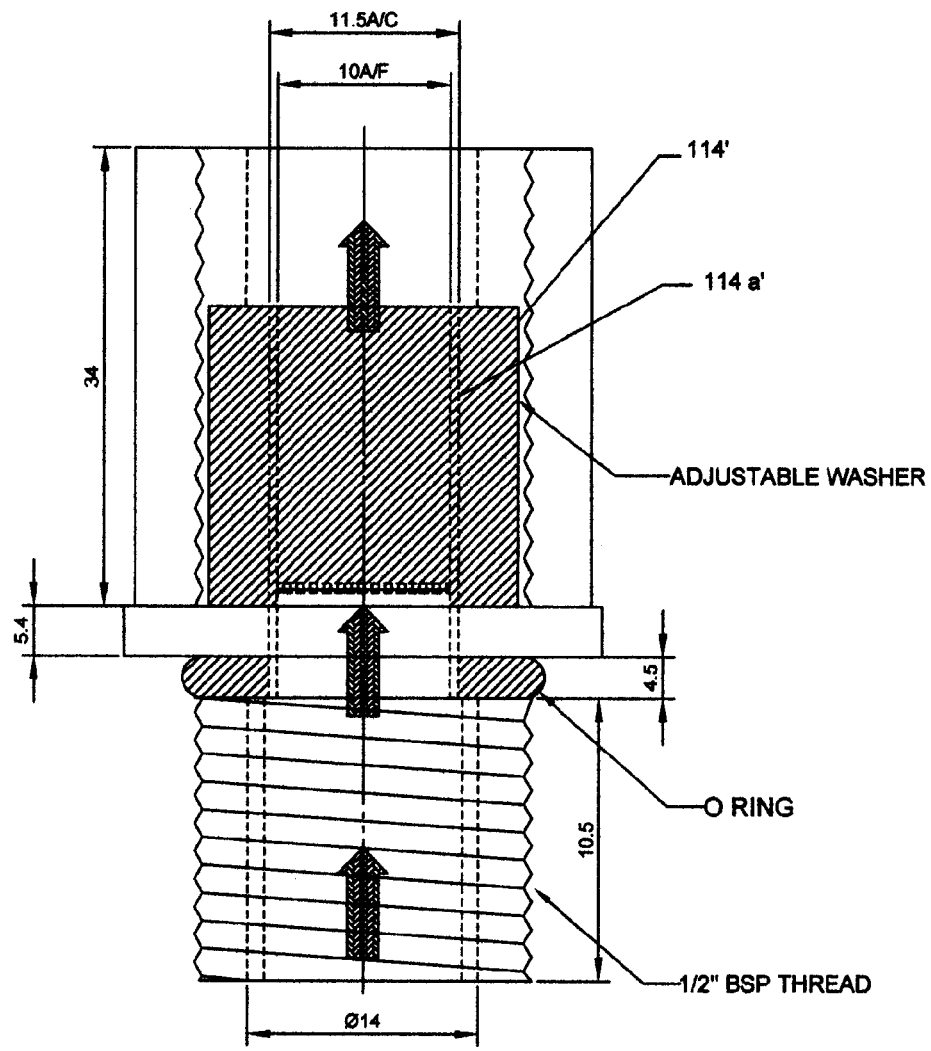
FIG. 7A illustrates a front view of an assembled adjustable length pipe connector of FIG. 1B having a differently configured washer, in accordance with an embodiment of the present invention.
Figure 7B:
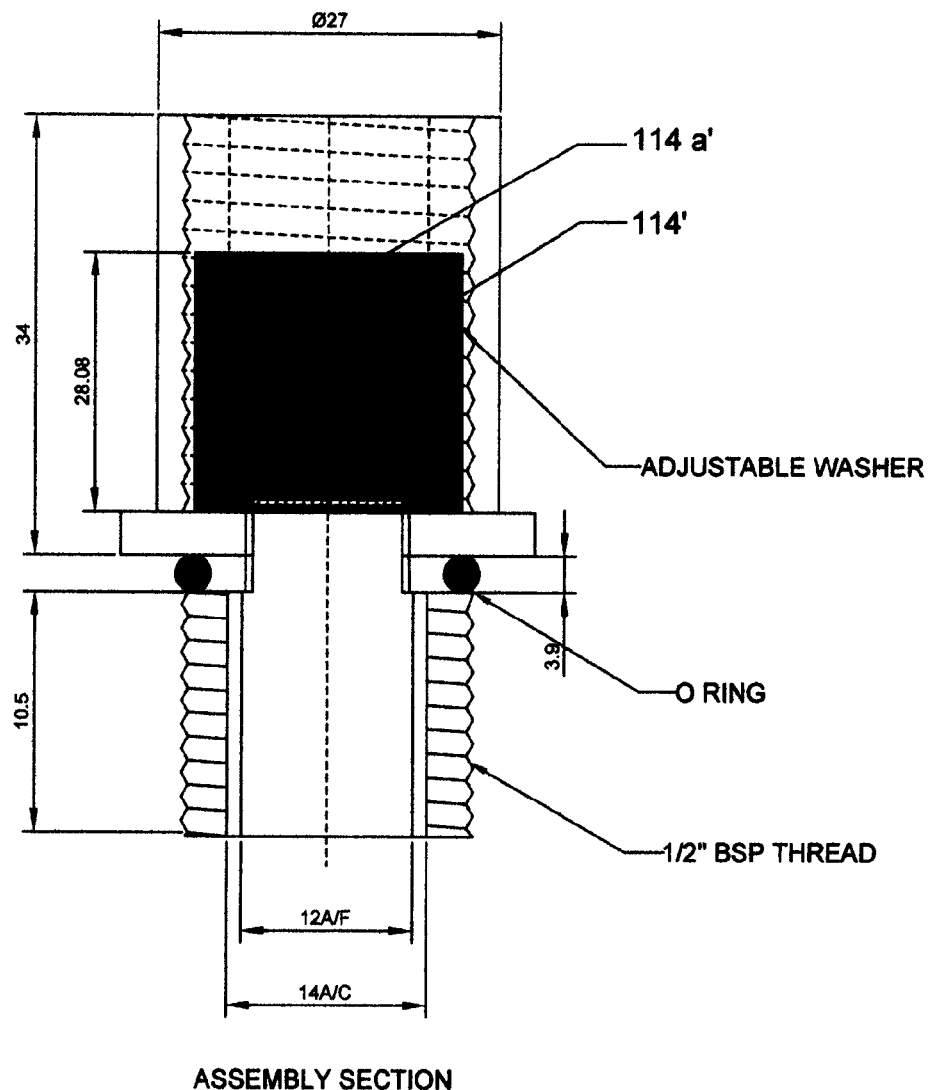
FIG. 7B illustrates a sectional view of an assembled adjustable length pipe connector of FIG. 1B having a differently configured washer, in accordance with an embodiment of the present invention.

The present invention envisages that various embodiments are present. In one of the embodiments, as shown in FIGS. 7A and 7B, a washer is provided that is differently configured than washer 114. Particularly, the present invention envisages a washer 114' having a cylindrical shape. The washer 114' has a central through-bore 114a'. The usage of the washer 114' would be apparent from the ensuing description.

Figure 7C:
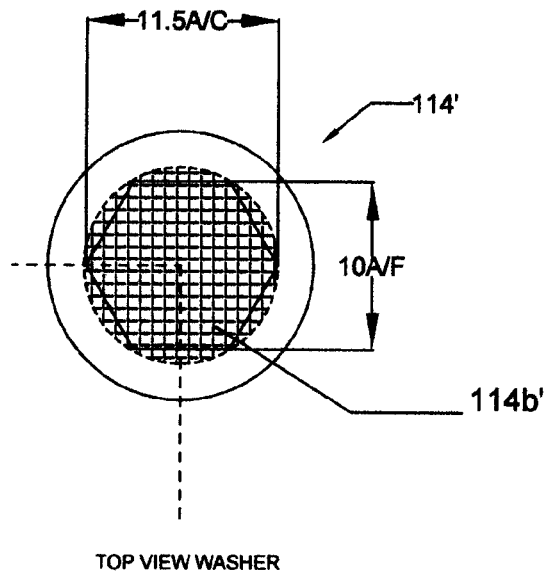
FIG. 7C illustrates a front view and top view of the washer, in accordance with another embodiment of the present image.
Figure 7C:
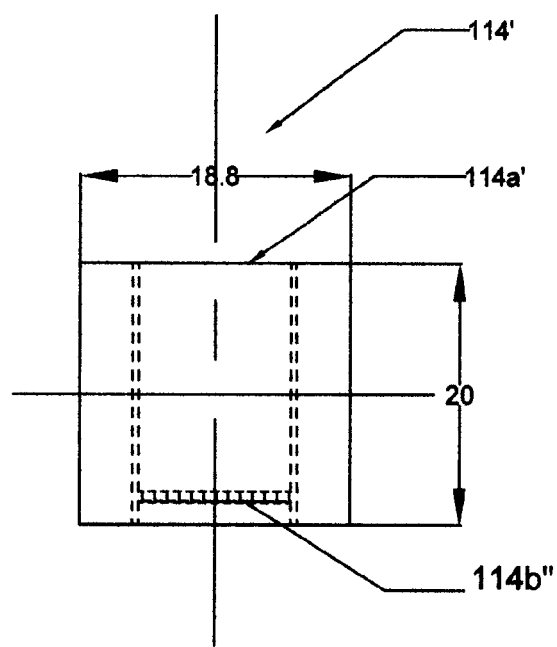

In yet another embodiment of present invention, as shown in FIG. 7C, the washer 114' may be configured to have a wire mesh 114b' embedded within the bore 114a' thereof. The wire mesh 114b' may be of 304 grade and would help to block any impurities, thereby acting as a filter.

Figure 7D:
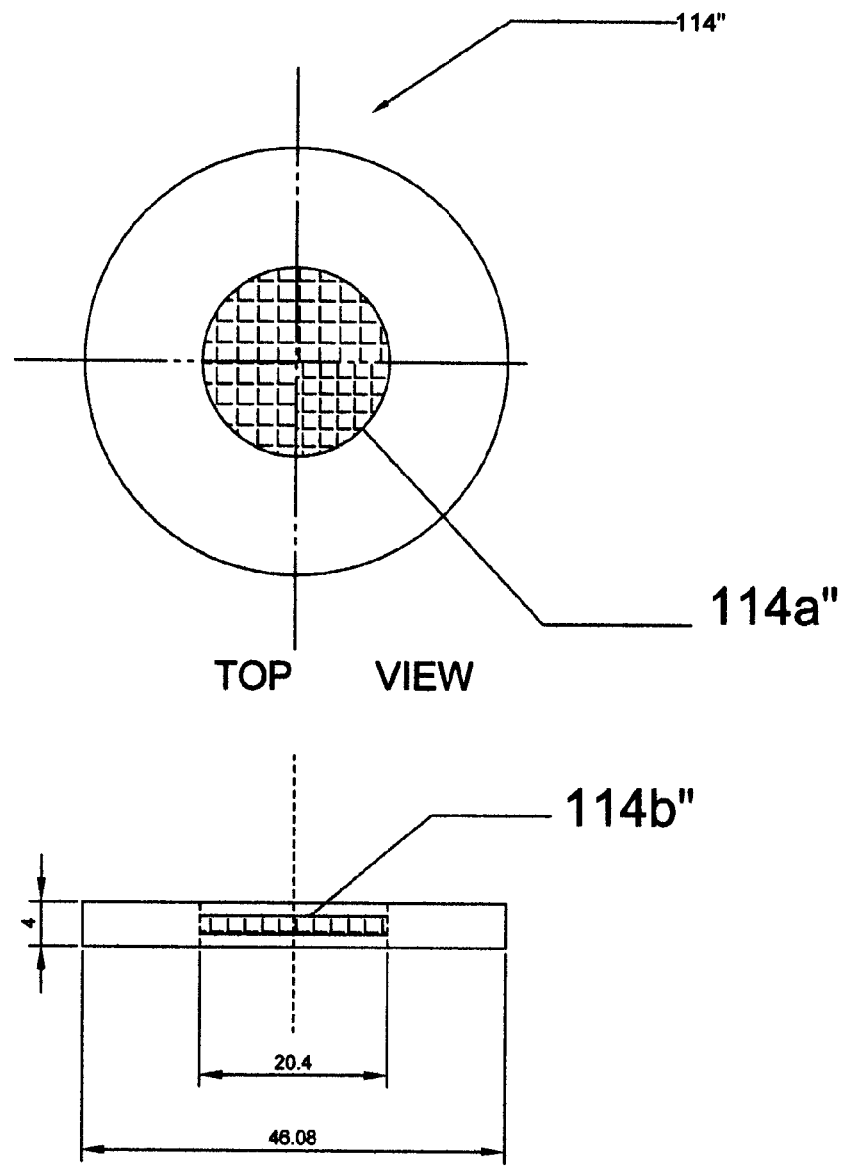
FIG. 7D illustrate a front view of the washer, in accordance with another embodiment of the present invention.
Figure 7E:
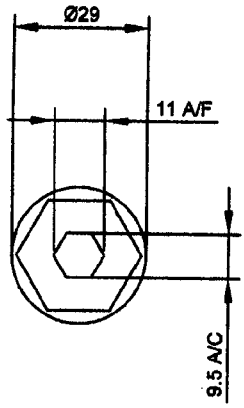
FIG. 7E illustrate an exploded view of adjustable length pipe connector of FIG. 1B using the washer of FIG. 7D.
Figure 7E:
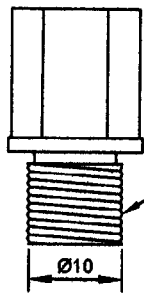
Figure 7E:
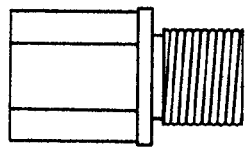
Figure 7E:
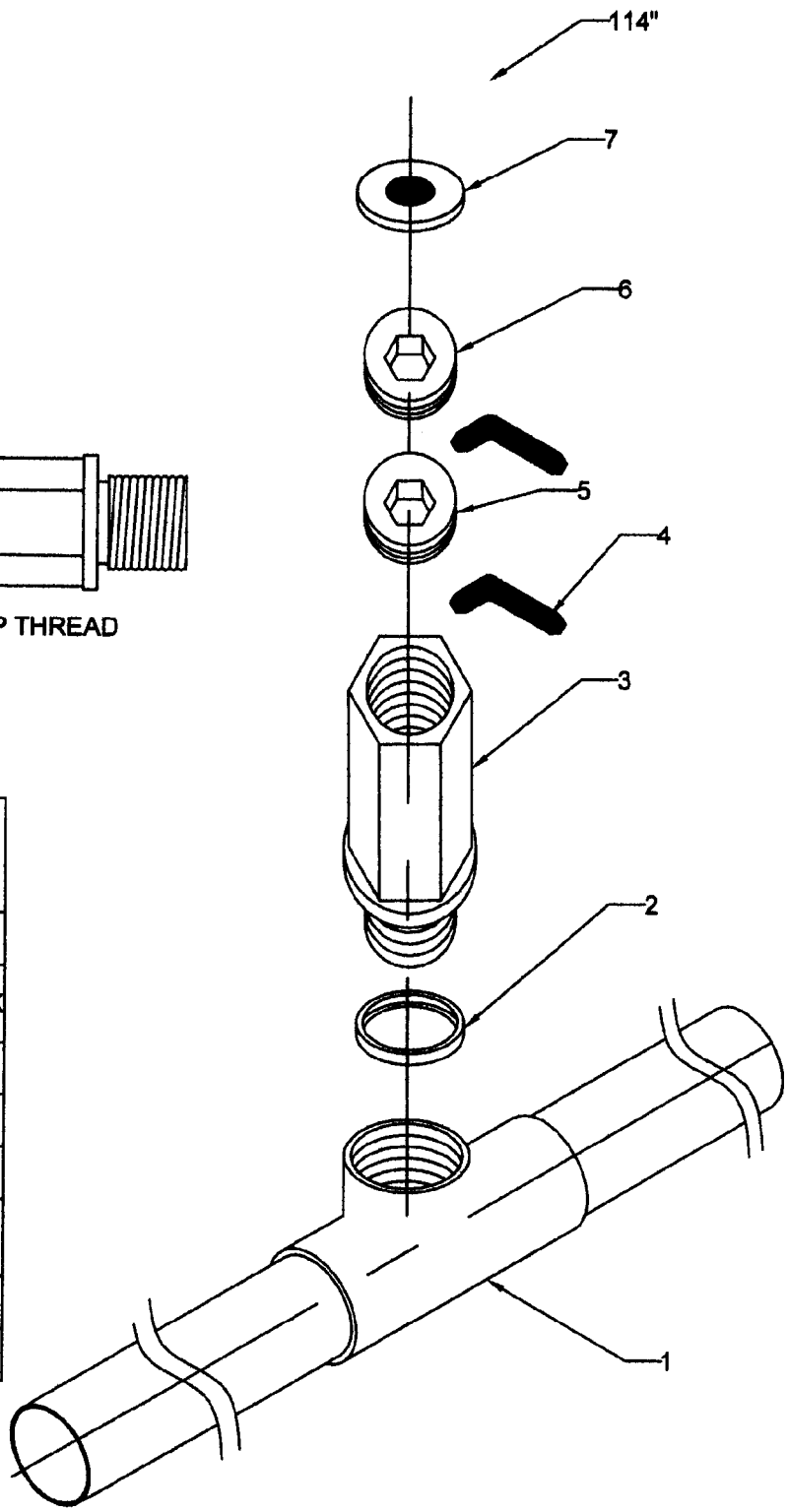

In still another embodiment of the present invention, as shown in FIG. 7D, the washer 114" is flat ring shaped having a wire mesh 114b" embedded within the body thereof, particularly in a bore 114a". The wire mesh 114b" may be of 304 grade and would help to block any impurities, thereby acting as a filter. FIG. 7E illustrates an exploded view of adjustable length pipe connector using the washer 114".

Figure 8:
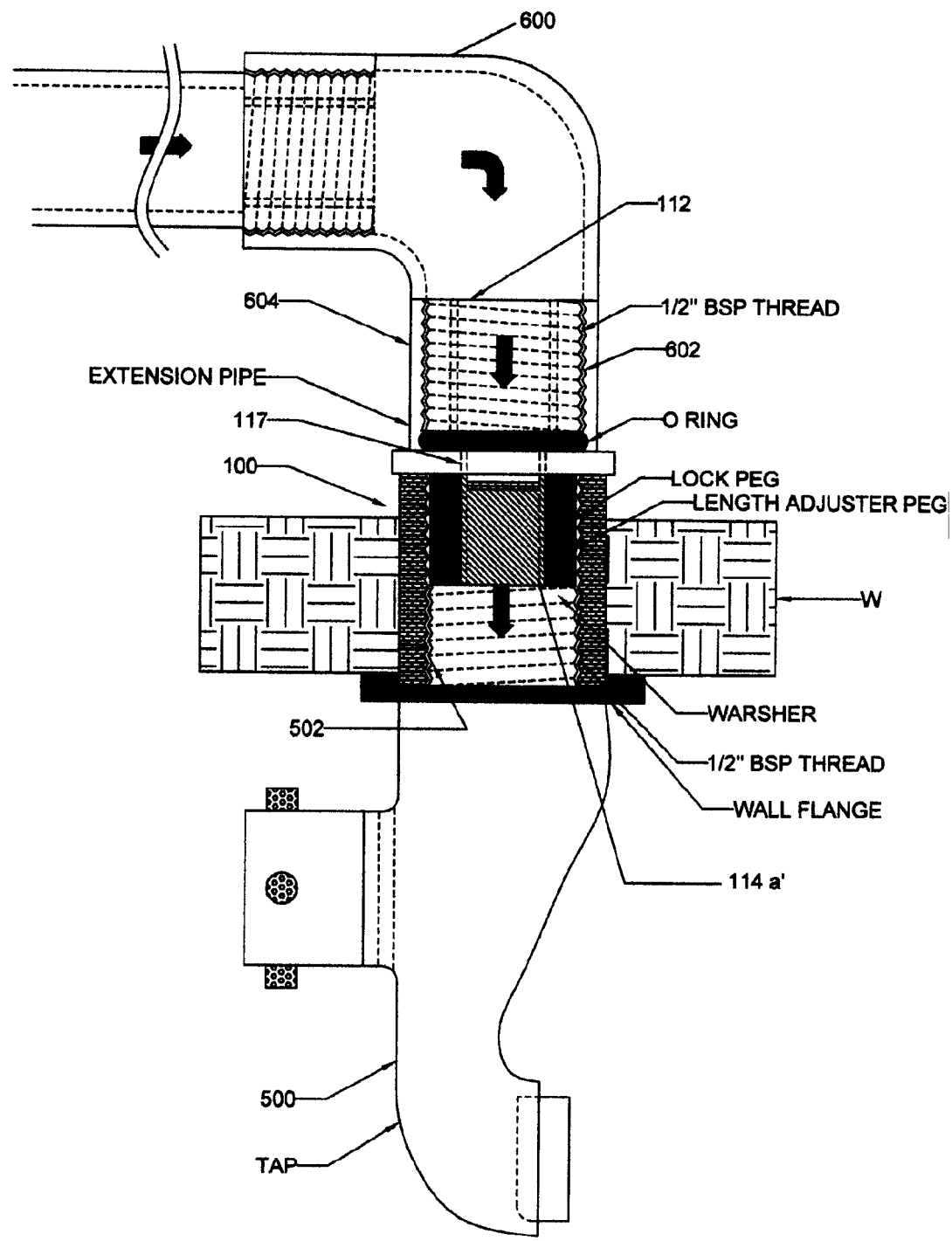
FIG. 8 illustrates the adjustable length pipe connector, having the washer of FIG. 7A, coupled to a pipe connection and a tap/faucet.

The use and assembly of the pipe connector 100 as per the two embodiments would now be explained with reference to FIG. 5 and FIG. 8.

Figure 5A:
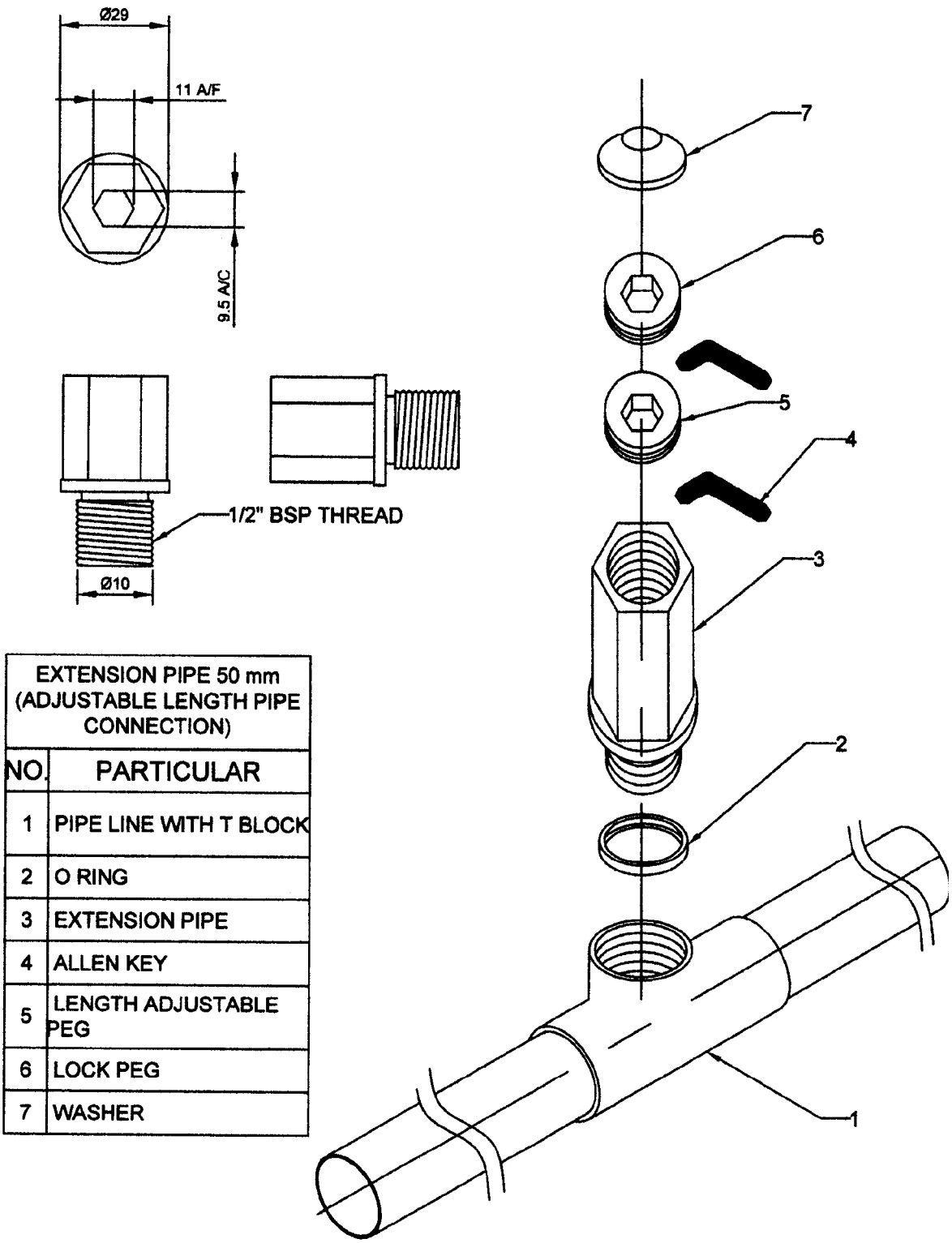
FIG. 5A illustrates an exploded view of adjustable length pipe connector of FIG. 1B.

In the first embodiment as per FIG. 5 and FIG. 5A and FIG. 7E, firstly, the external threads 108 of the rear body portion 102b are received within the threaded open end 604 of the elbow joint 600 and the pipe connector 100 is rotated to as to mate the external threads 108 with the threads 602 of the elbow joint 600. As mentioned earlier, the pipe connector 100 can be rotated with the help of a hexagonal wrench clasping the first body portion 102a or with the help of an Allen key received in the hexagonal through-bore 117 of the peripheral flange 116 from the front body portion 102a. Thus, the pipe connector 100 can be easily tightened even at places where it is difficult for the wrench to clasp the front body portion 102a. The pipe connector 100 is tightened until the peripheral flange 116 abuts the open end 604. Once the peripheral flange 116 abuts the open end 604, the pipe connector 100 cannot be further rotated, and this helps to prevent the open end 604 from cracking due to excessive pressure being applied thereto. The second predetermined length of the rear body portion 102b, and the external threads 108, is sufficient to account for depth within the wall "W" at which the open end 604 of the elbow joint 600 may be disposed. In an embodiment of the present embodiment, the second predetermined length may range between 13-17 mm. However, the present invention should not be considered as restricted to the described length only and any other suitable length would also lie within the scope of the present invention. The pre-determined length is so selected that upon connection to the open end 604, the rear body portion 102b does not extend into the body of the elbow joint 600 and hence no interference to water flow is caused, unlike in the conventional pipe connectors. Further, the seal ring 118 acts as a packing to effectively seal the connection between the external threads 108 and the threaded open end 604, thereby ensuring a leak-proof joint.

After coupling the pipe connector 100 to the elbow joint 600, the tap/faucet 500 is coupled. To couple the tap/faucet, the desired length out of the first predetermined length of the pipe body 102 is determined and marked. The desired length is determined based on the length of external threads 502 on the end of the tap/faucet 500.

In accordance with one embodiment, as shown in FIG. 1B, the desired length is determined to be "D". The remaining excess length "U" of the pipe body 102 is cut and removed. In the described embodiment, after cutting the excess length 'U', the pegs 122 and 124 are moved axially along the internal threads 104, with the help of rotational motion of Allen key fixed to the bore 128. The pegs 122 and 124 are positioned while taking into account the length of external threads 502 of the tap 500. As shown, the peg 122 is positioned at one end of the desired length "D" and the peg 124 is disposed adjacent to the peg 122 such that it acts as an additional support for peg 122 and acts as a stopper to prevent downward movement of peg 122 while tightening the tap/faucet to the internal threads 104.

After positioning the peg 122, 124 as desired, the washer 114 may be inserted within the first body portion 102a to be positioned adjacent to the first length adjustor peg 122. Once assembled, the bore 114a or 114a" of the washer 114 or 114a", the through-bores 128 of the pegs 122, 124, the through-bore 117 of the peripheral flange 116 and the through-bore 112 of the rear body portion 102b are linearly aligned, thereby configuring a straight water flow path, as shown in FIG. 5. Thereafter, the tap 500 may be coupled to the front body portion 102a by mating the external threads 502 thereof with the internal threads 104 and rotating the tap 500 so as to tighten the tap 500. As shown, the pegs 122 and 124 are positioned such that the washer 114/114" just touches the end of the external threads 502 of the tap 500. In the event, while tightening, the tap 500 is angularly oriented, the pegs 122 and 124 may be moved slightly forward or backward axially so as to enable further rotation of the tap 500 so as to align the same vertically. Once assembled, the tap/faucet 500 is ready to use and water flows through the pipe connector 100 into the tap 500, as shown by bold arrows in FIG. 5.

Figure 9:
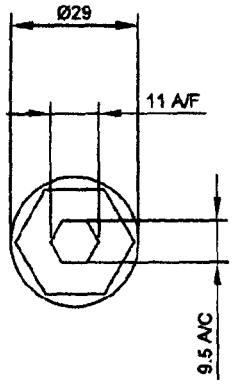
FIG. 9 is an exploded view of assembled adjustable length pipe connector of FIG. 7A.
Figure 9:
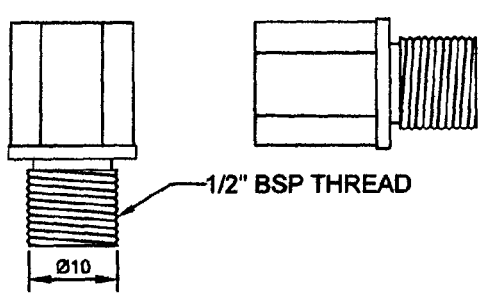
Figure 9:
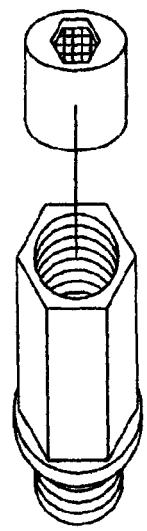
Figure 9:
Figure 9:
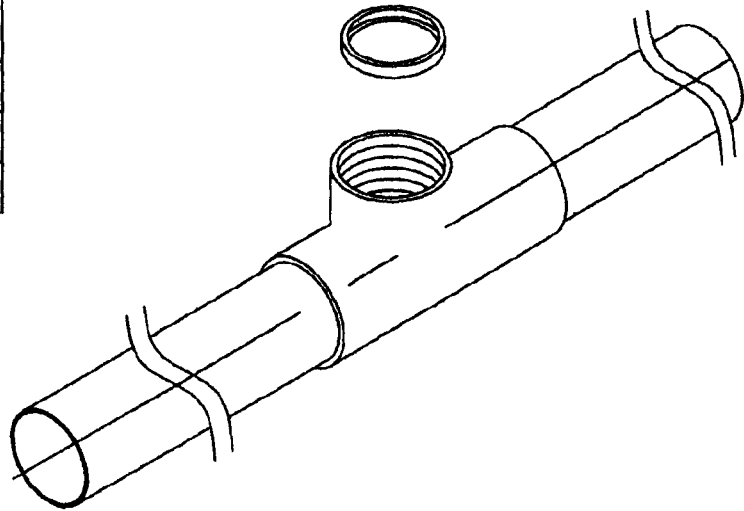

Further, there may be a situation that the threaded end of tap 500 is not very lengthy and is of just the sufficient length to be completely accommodated within the front body portion 102*a*. For instance, the threaded end of tap 500 varies generally from 12 mm to 20 mm. In case of a 12 mm end, the same may be completely accommodated within the front body portion 102*a*. In such a case, the pegs 122, 124 are not required for adjusting the length and thus the washer 114' may be only used for ensuring a leak-proof connection. This is another embodiment shown in FIG. 8 and FIG. 9. The rear body portion 102*b* is coupled to the open end 604 in the same manner as explained above. Thereafter, to couple the tap 500, the washer 114' is inserted in the front body portion 102*a* such that the bore 114*a*' of the washer 114', the through-bore 117 of the peripheral flange 116 and the through-bore 112 of the rear body portion 102*b* are linearly aligned, thereby configuring a straight water flow path. If required, the washer 114' may be cut along its length in accordance with the length of the threaded end of the tap 500. The tap 500 is thereafter coupled to the front body portion 102*a* by mating the external threads 502 thereof with the internal threads 104 and rotating the tap 500 so as to tighten the tap 500. Once assembled, the tap/faucet 500 pushes against the washer 114', thereby making a leak-proof connection. The tap 500 is ready to use and water flows through the pipe connector 100 into the tap 500, as shown by bold arrows in FIG. 8.

Thus, the pipe connector 100 is configured to have adjustable length such that the length of the pipe connector is capable of being adjusted as per the desired length depending upon the length of threaded end of the tap/faucet. Thus, the same connector 100 is adaptable to be used for different pipe connections. Further, the pipe connector 100 is easy to manufacture and does not require any complex machining. Moreover, as explained, the pipe connector 100 is easy to install without requiring the services of a skilled personnel, such as a plumber and also is relatively leak-proof. Additionally, the pipe connector 100 provides a cost-effective solution for coupling a tap to pipe connection.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present invention.

I claim:

1. An adjustable length pipe connector for connecting to a pipe connection, the adjustable length pipe connector comprising:

an axially extending and hollow pipe body having a from body portion of a first predetermined length and a rear body portion of a second predetermined length, the front body portion having internal threads configured therein, and ti rear body portion having external threads configured thereon for coupling the adjustable length connector to the pipe connection;

a peripheral flange configured on the rear body portion to give extra strength to the pipe connector, the Range positioned adjacent to portion between the front body portion and the rear body portion;

a seal ring positioned adjacent to the peripheral flange; and a washer configured within the front body portion, the washer being adapted to be moved axially within the front body portion, wherein the front body portion has a hexagonal shape, and wherein the rear body portion has a hexagonal through-bore configured on a transverse face thereof, and wherein, in use, the first predetermined length is adapted to be cut to a desired length upon requirement.

2. The adjustable length pipe connector of claim 1, comprising a pair of length adjustor peg configured within the front body portion, the length adjustor pegs adapted to be positioned within the from body portion to achieve the desired length.

3. The adjustable length pipe connector of claim 2, wherein each of the pair of length adjustor pegs has a central hexagonal bore for enabling fluid entering through the pipe connection to pass therethrough.

4. The adjustable length pipe connector of claim 3, wherein each of the length adjustor pegs has threads configured on peripheral surface thereof so as to mate with the internal threads of the front body portion for enabling the pegs to be moved within the Front body portion, thereby achieving the desired length.

5. The adjustable length pipe connector of claim 2, wherein each of the pair of length adjustor pegs is made of plastic comprising nylon, polycarbonate, PVS, ABS etc or a metal comprising brass, aluminium, SS and the like.

6. The adjustable length pipe connector of claim 1, wherein the washer is frustoconical in shape for enabling easy insertion and manipulation within the front body portion.

7. The adjustable length pipe connector of claim 1, wherein the washer is cylindrical in shape and has a third pre-determined length adapted to be cut to a desired length upon requirement.

8. The adjustable length pipe connector of claim 1, wherein the washer is flat ring shaped.

9. The adjustable length pipe connector of claim 1, wherein the washer is made of rubber comprising synthetic, nitrile, silicon, EPDM and the like or natural rubber.

10. The adjustable length pipe connector of claim 1, wherein the washer has a wire mesh configured therewith to act as a filter.

11. The adjustable length pipe connector of claim 1, wherein each of the pair of length adjustor pegs has a hexagonal through-bore for receiving on Allen key to move the pegs axially within the front body portion.

12. The adjustable length pipe connector of claim 1, wherein die hexagonal shape of the front body portion and the hexagonal through-bore on the transverse face of the rear body portion are used optionally to tighten the adjustable length pipe connector to the pipe connection.

13. The adjustable length pipe connector of claim 1, wherein the seal ring is received in a groove configured on the rear body portion adjacent to the peripheral flange, thereby preventing dislocation of the seal ring.

* * * * *